No. 839,027.

PATENTED DEC. 18, 1906.

P. O. PEDERSEN.
ELECTRIC CONTACT DEVICE.
APPLICATION FILED APR. 15, 1904.

3 SHEETS—SHEET 1.

Witnesses:

Inventor
Peder Oluf Pedersen

No. 839,027. PATENTED DEC. 18, 1906.
P. O. PEDERSEN.
ELECTRIC CONTACT DEVICE.
APPLICATION FILED APR. 18, 1904.
3 SHEETS—SHEET 3.
Fig. 9.
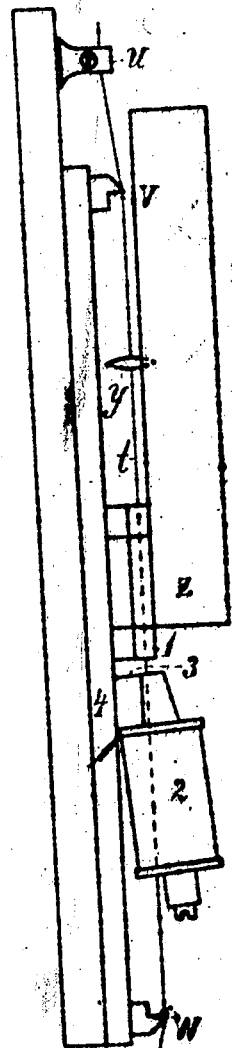
Fig. 10.
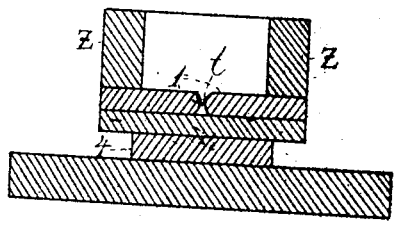
Fig. 11.
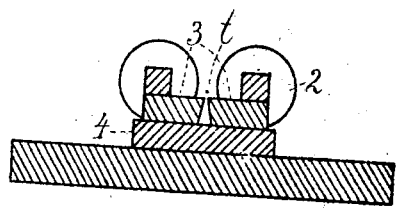
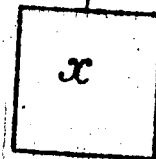
Witnesses:
Frank S. Ober
Waldo M. Chapin
Inventor
Peder Oluf Pedersen
by W. A. Rosenbaum
atty

UNITED STATES PATENT OFFICE.

PEDER OLUF PEDERSEN, OF COPENHAGEN, DENMARK.

ELECTRIC CONTACT DEVICE.

No. 839,027.  Specification of Letters Patent.  Patented Dec. 18, 1906.

Application filed April 15, 1904. Serial No. 203,312.

*To all whom it may concern:*

Be it known that I, PEDER OLUF PEDERSEN, a citizen of the Kingdom of Denmark, residing in Copenhagen, Denmark, have invented certain new and useful Improvements in and Relating to Electric Contact Devices, of which the following is a specification.

In relatively quick vibrating bodies, the movements of which should be used for closing a contact—for instance, by the resonance-relays known to electrotechnics—it is difficult to obtain a sufficiently good and lasting contact, so that the necessary amount of energy might pass through the contact device.

The present invention relates to a device by which this is obtained in a most easy and simple manner by means of a magnet attracting and, if desired, retaining the vibrating body.

This invention is illustrated in the accompanying drawings, in which—

Figure 1:
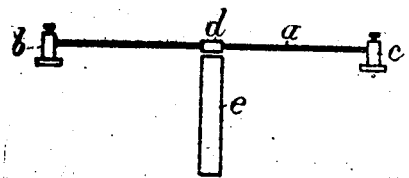
Figure 4:
Figure 2:
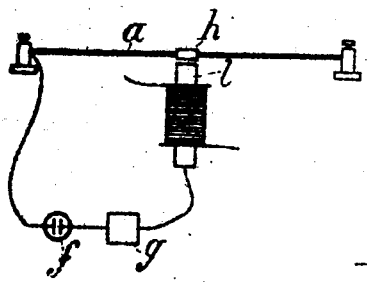
Figure 3:
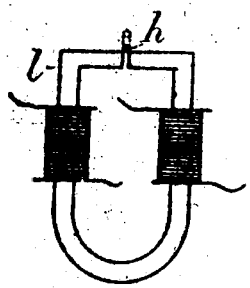

Figures 1 and 2 show the device used in connection with a resonance-relay of the kind described in the British Patent No. 16,810/01. Fig. 3 is a side elevation of the magnet shown in Fig. 2. Figs. 4 to 7 illustrate different embodiments of contact devices acted upon by the vibrating body. Fig. 8 is a view in front elevation of a constructional form of device used in practice. Fig. 9 is a view of the same in side elevation. Fig. 10 is a section on the line A B, Fig. 8. Fig. 11 is a section on the line C D, Fig. 8.

The string $a$ (shown in Fig. 1) is suspended between the fixed binding-screws $b$ and $c$ and can be brought into vibration in a vertical plane—as, for instance, by a part of the string being placed in a magnetic field, the lines of force of which are perpendicular to the plane of the vibrations of the string, which is of metal and through which an alternating or varying current is passed, the frequency of which current corresponds to that of the string during free vibration. The effects of the current impulses being accumulative, the string soon reaches a considerable amplitude. The string carries a small armature $d$, which is arranged at a short distance from a magnet $e$, which latter, on account of the tensile strength of the string, is unable to attract the armature $d$ when the string is in a position of rest. However, when the string is brought into vibration it will by its vibration soon get so near to the magnet $e$ that the armature $d$ will be attracted and retained by same. By the contact between armature and magnet hereby produced a local circuit is closed, as shown in Fig. 2, wherein the battery $f$ is closed through a working apparatus $g$ as soon as the armature $h$ is brought in contact with the magnet $l$, which is here an electromagnet, and which may be energized, as usual, from some suitable source of electricity. The magnet-circuit may be interrupted automatically as soon as the apparatus $g$ has operated, and the string is then released and is again ready to repeat the cycle. If the string be made of iron or steel, the armature is superfluous.

It has been proved most practical to use an electromagnet the poles of which are bent closely together, Fig. 3. Sometimes it might be suitable to use as contacts two fixed pieces $i$, between which the string, or possibly a contact-piece $k$, insulated from the string, makes or breaks the circuit, Fig. 4.

Figure 5:
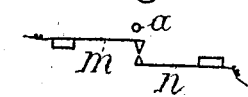

In Fig. 5 the contact is caused by the string $a$ acting upon a resilient contact $m$ $n$, which is independent of the attracting-magnet.

Figure 6:
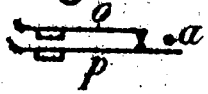

In Fig. 6 is shown how the string $a$ by its vibration can cause the interruption of the already-existing contact made between the resilient contact-pieces $o$ and $p$ by acting upon the contact-piece $p$.

Figure 7:
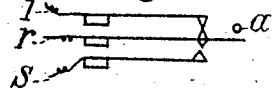
Figure 8:
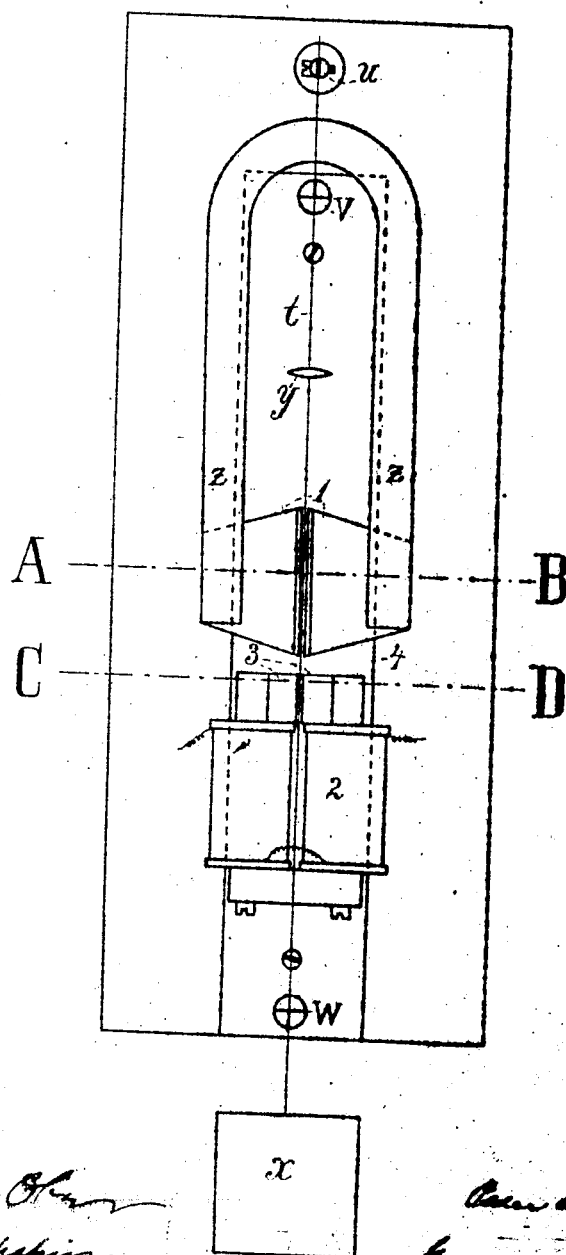

Again, Fig. 7 shows a combination of both of the devices shown in Figs. 5 and 6, the string being capable of causing the interruption of a contact between the contact-pieces $q$ and $r$ and of then closing a contact between the contact-pieces $r$ and $s$. It must still be remarked that it is possible to devise the apparatus in such a manner that the magnet which causes the movements of the vibrating body can be used at the same time as a retaining-magnet.

In the modification shown in Fig. 8 the string $t$ is fastened in a binding-screw $u$ and placed over the insulating-prisms $v$ and $w$ and carries a weight $x$. A small weight $y$ is placed on or near the middle of the strip. The magnet $z$ produces a powerful magnetic field between the pole-pieces 1. The core and the pole-pieces 3 of an electromagnet 2 are placed in circuit with the metal plate 4, to which the above-mentioned parts are fastened. As seen from Fig. 10, the string is placed at the center of the field, due to the magnet $z$, while in Fig. 11 it is shown placed over the pole-pieces of the electromagnet 2.

The device acts in the following manner: When an alternating current or a varying direct current of a frequency corresponding to that of the string during self-vibration passes through the string $t$, the same will, under the influence of the field produced by the magnet $z$, be brought into vibration, and when the amplitude has reached a certain degree the string will be retained by the magnet 2, which at this time is energized. Hereby is closed a contact between the string $t$ and one or both of the pole-pieces 3. When the circuit closed by the contact has permitted the current to perform its function, the current to the magnet 2 is interrupted, by which the string is set free. The weight $y$ serves to increase the mass of the vibratile body, and thus permits the amplitude of vibration of the body to more rapidly increase.

Having thus described my invention, I claim as new and desire to secure by Letters Patent—

1. A relay for pulsating or alternating currents comprising a conducting-body capable of vibrating with a definite periodicity, a magnet, and means whereby currents may be passed through said body, said body having a magnetic portion by which it is attracted and held to said magnet when its vibrations have increased to a predetermined amount.

2. A relay for pulsating or alternating currents comprising a conducting-body capable of vibrating with a definite periodicity, a magnet, means whereby currents may be passed through said body, said body having a magnetic portion by which it is attracted and held to said magnet when its vibrations have increased to a predetermined amount, and a local circuit arranged to be closed when the body is in such held relation to the magnet.

In testimony that I claim the foregoing as my invention I have signed my name in presence of two subscribing witnesses.

PEDER OLUF PEDERSEN.

Witnesses:
CECIL VILHELM SCHOU,
FLEMMING ALGREER USPIRG.